(12) United States Patent
Lounge et al.

(10) Patent No.: US 6,523,783 B2
(45) Date of Patent: Feb. 25, 2003

(54) UNDERWAY REPLENISHMENT SYSTEM FOR SPACE VEHICLES

(75) Inventors: John M. Lounge, Bayou Vista, TX (US); Frank Eichstadt, Kemah, TX (US)

(73) Assignee: Spacehab, Inc., Washington, DC (US)

( * ) Notice: Subject to any disclaimer, the term of this patent is extended or adjusted under 35 U.S.C. 154(b) by 0 days.

(21) Appl. No.: 09/747,012

(22) Filed: Dec. 22, 2000

(65) Prior Publication Data

US 2002/0079407 A1 Jun. 27, 2002

(51) Int. Cl.$^7$ .............................................. B64G 1/64
(52) U.S. Cl. ....................................................... 244/161
(58) Field of Search ................................ 244/161, 159, 244/158 R

(56) References Cited

U.S. PATENT DOCUMENTS 4,083,520 A * 4/1978 Rupp et al. .................. 244/167
4,712,753 A * 12/1987 Howard ....................... 244/161

OTHER PUBLICATIONS

Bogar et al., Hypersonic Airplane Space Tether Orbital Launch (HASTOL) System: Interim Study Results, AIAA–99–4802.*

Forward, Tether Transport from LEO to the Lunar Surface, AIAA–91–2322.*

Forward et al., Space Tethers, Scientific American: The Way to Go in Space: Feb. 1999.*

Tethers Unlimited Inc., Momentum Exchange Tethers, http://www.tethers.com/MXTethers.html.*

* cited by examiner

*Primary Examiner*—Peter M. Poon
*Assistant Examiner*—Timothy D. Collins
(74) *Attorney, Agent, or Firm*—Rossi & Associates

(57) ABSTRACT

An underway replenishment system is used to deliver payloads and supplies to an orbiting receiving space vehicle. This system combines the advantages of the maneuverability of a delivering space vehicle with the large payload capacity of expendable launch vehicles to minimize payload delivery cost. Large payloads are launched into low orbit with expendable launch vehicles. A delivering space vehicle rendezvous with the independently launched payloads and assembles them into a payload stack. The receiving space vehicle located at a higher orbit deploys a tether towards the orbital path of the delivering space vehicle located at a lower orbit, and the tether is used to capture and retrieve the payload from the delivering space vehicle to the receiving space vehicle.

3 Claims, 4 Drawing Sheets

UNDERWAY REPLENISHMENT SYSTEM FOR SPACE VEHICLES

FIELD OF THE INVENTION

The invention relates in general to a system for transferring payloads between two orbiting space vehicles. More specifically, the invention relates to a tether system that is used to transfer payloads from one orbiting space vehicle to another orbiting space vehicle.

BACKGROUND OF THE INVENTION

Space vehicles in long term Earth orbit, such as the International Space Station (ISS), require periodic deliveries of payloads in order to replenishment supplies and provide replacement equipment. Conventional methods of accomplishing payload delivery require the use of a transfer vehicle, such as the Space Shuttle, to hard dock with the orbit vehicle during payload transfer. Hard docking between two space vehicles, however, requires extremely precise maneuvering to avoid damaging the fragile structures of the vehicles. The difficulties and dangers become most apparent when the visiting vehicle is an unmanned spacecraft, wherein a failure of automatic docking can result in collision between the vehicles.

In addition to the inherent dangers associated with each hard docking, a visiting vehicle must be launched into an orbit substantially equivalent to the orbit of the receiving vehicle in order to achieve a hard docking. Payload launch mass performance could be enhanced if the visiting vehicle's orbit was not required to be as high as the receiving vehicle's orbit, while still providing a mechanism to transfer payload from the visiting vehicle to the receiving vehicle.

In view of the above, it is an object of the present invention to provide a system which reduces the hazards of rendezvous and payload transfer between an orbiting receiving space vehicle and a visiting space vehicle. It is a further objection to permit rendezvous and payload transfer between a lower orbiting visiting space vehicle and a higher.

SUMMARY OF THE INVENTION

The present invention provides an optimized system to deliver cargo to an orbiting receiving space vehicle such as the ISS. The system combines the advantages of the maneuverability of a delivering space vehicle, such as the Space Shuttle, with the large payload capacity of expendable launch vehicles to minimize payload delivery cost. Large payloads are launched into low orbit with expendable launch vehicles. A delivering space vehicle rendezvous with these independently launched payloads and assembles them into a payload stack. The receiving space vehicle located at a higher orbit deploys a tether towards the orbital path of the delivering space vehicle located at a lower orbit, and the tether is used to capture and retrieve the payloads from the delivering space vehicle to the receiving space vehicle.

In a preferred embodiment, a system for underway replenishment of an orbiting receiving space vehicle includes a tether retrieval system coupled to the receiving space vehicle, and at least one orbiting payload adapted to be coupled to the tether retrieval system. The receiving space vehicle captures and retrieves the orbiting payload with the tether retrieval system.

The tether retrieval system preferably includes a tether system base, a tether reel assembly coupled to the tether system base, a tether coupled to the tether reel assembly at a proximal end thereof, and tether distal end component coupled to a distal end of the tether. The distal end component is preferably a free-flying module that is capable of performing independent maneuvers. If desired, the tether retrieval system is further provided with a payload assembly fixture.

A delivering space vehicle used with the system includes a payload assembly fixture, wherein the delivering space vehicle includes means for capturing payloads in Earth orbit and installing the payloads on the payload assembly fixture to form a payload stack.

In operation, the delivering space vehicle and at least one payload are launched into Earth orbit. The payload is captured and installed onto the payload assembly fixture provided in the delivering space vehicle. The delivering space vehicle is manuevered into proximity with the receiving space vehicle including the tether retrieval system. The tether retrieval system of the receiving space vehicle is used to transfer the payload from the delivering space vehicle to the receiving space vehicle.

Other advantages and features of the invention will become apparent from the following detailed description of the preferred embodiments and the accompanying drawings.

BRIEF DESCRIPTION OF THE DRAWINGS

The invention will now be described with reference to certain preferred embodiments thereof and the accompanying drawings, wherein.

DETAILED DESCRIPTION OF THE PREFERRED EMBODIMENTS

The present invention is based—in part—on the recognition that methods used by the United States Navy to transfer supplies and replenish fuel between two ocean going ships underway can be adapted for use with orbital vehicles. Specifically, two ships are placed on parallel courses and a connecting cable is deployed between the two ships. The flexible cable acts as a bridge for the transfer of re-supply cargo. The ships never hard dock with each other during transfer, thereby minimizing risks associated with immediate proximity operations.

Still further, the present invention is based—in part—on the recognition that standardized couplings utilized conventional railroad operations can also be adapted for use with orbital vehicles. Specifically, conventional railroad operations utilize standardized couplings to assemble a train of cargo carrying cars pulled by a locomotive. The length of the train can be adjusted depending on the required application, and can also be configured based on the cargo to be transported.

By combining elements of conventional systems of the type described above, the present invention provides an optimized system to deliver cargo to an orbiting receiving vehicle. Specifically, the system enables the advantages of the maneuverability of a manned delivering space vehicle, such as the Space Shuttle, with the large payload capacity of expendable launch vehicles to minimize payload delivery cost. Large payloads are launched into low orbit with expendable launch vehicles. A delivering space vehicle rendezvous with each independently launched payload and assembles them into a "space train". The receiving space vehicle located at a higher orbit deploys a tether towards the orbital path of the delivering space vehicle located at a lower orbit, and the receiving space vehicle captures the delivering space vehicle with the tether and retrieves either the vehicle itself or its payload back towards the receiving space vehicle.

Figure 1:
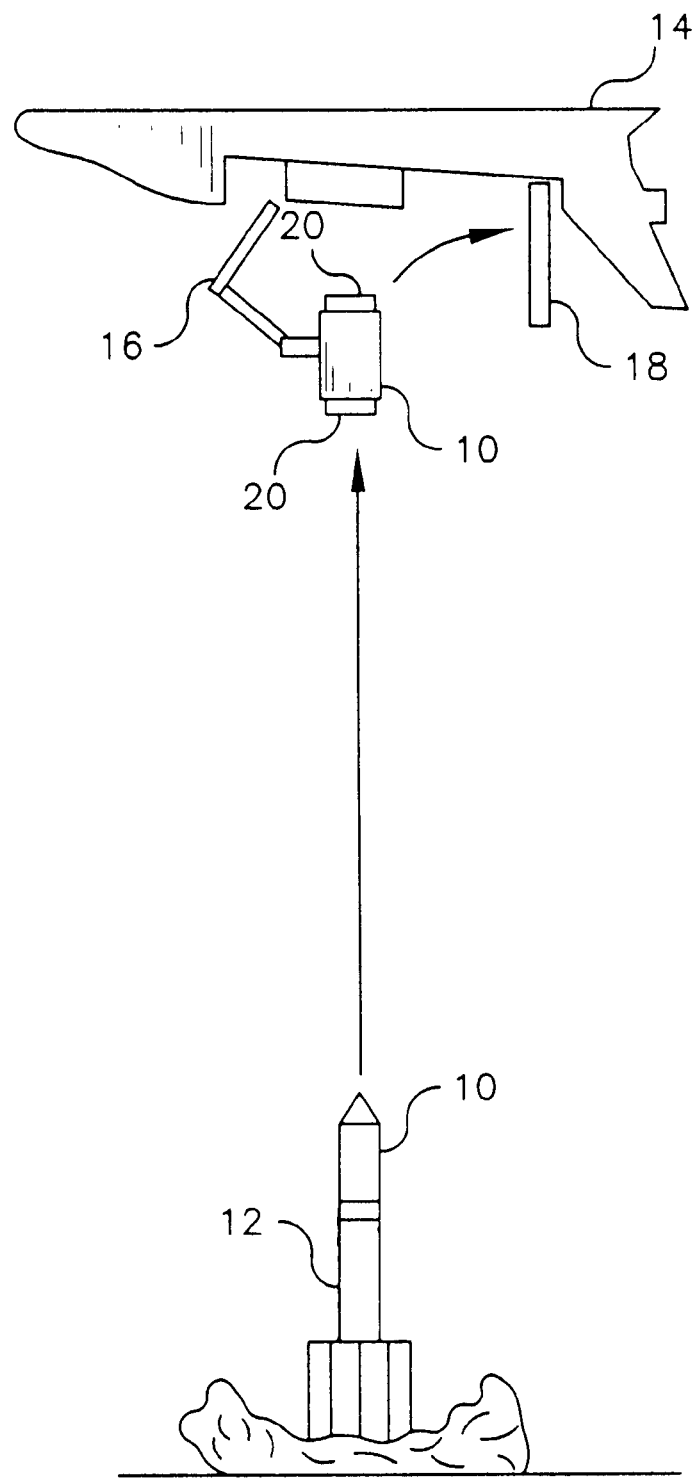
FIG. 1 illustrates the launch and capture by a delivering space vehicle of a first independently launched payload.
Figure 2:
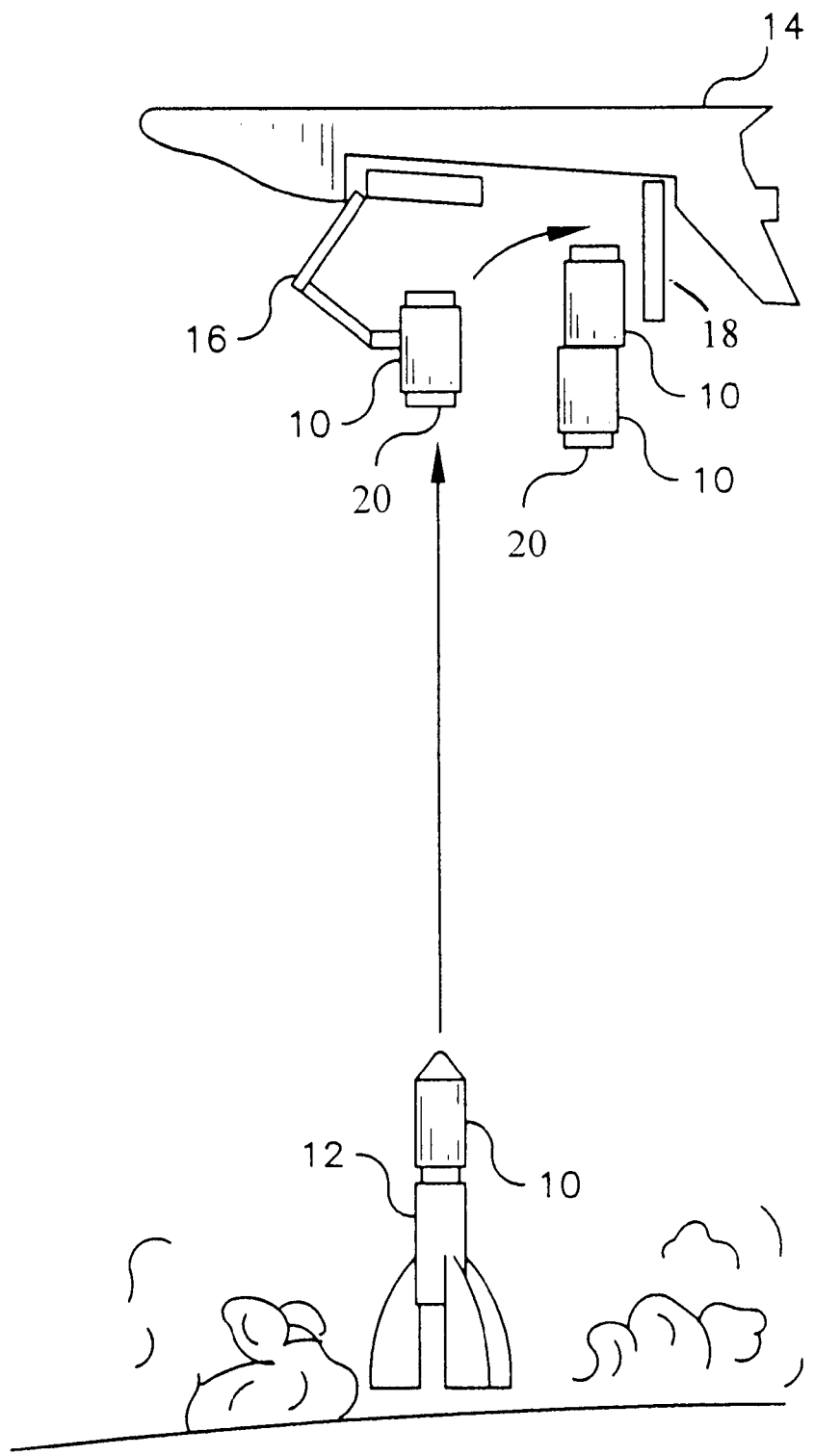
FIG. 2 illustrates the launch and capture by the delivering space vehicle of a further independently launched payload being assembled into a stack.

Referring now to FIG. 1, according to a preferred embodiment of the present invention, individual payloads 10 are launched into low Earth parking orbits with an expendable launch vehicles 12. A delivering space vehicle 14 sequentially rendezvous with each payload 10 and captures the payload 10 using a remote manipulator arm 16 to grab a standard grappling fixture provided on the payload 10. As each payload 10 is captured, it is loaded onto a payload assembly fixture 18 provided on the delivering space vehicle 14. In the illustrated embodiment, the payload assembly fixture 18 takes the form of a rail like structure that extends from the cargo bay of the delivering space vehicle 14. The ends of the payloads 10 are provided with standardized couplings 20, such that the payloads 10 lock together to form a stack when placed end to end on the payload assembly fixture 18 as shown in FIG. 2. The delivering space vehicle 14 with the attached payloads 10 forms a "space train", wherein the delivering space vehicle 14 acts as the "locomotive" and the payloads 10 act as the "cars" of the train.

As the payloads 10 must be equipped with interfaces to make them compatible with deployment into orbit by an expendable launch vehicle 12, it is preferably that the interface be in the form of the standardized coupling 20 discussed above which is also used to link payloads 10 together. Accordingly, the standardized coupling 20 that mates the payload 10 to the expendable launch vehicle 12 separates from the upper stage of the expendable launch vehicle 12 and is retained with the payload 10 as the payload 10 is inserted into a desired parking orbit. In a preferred embodiment the design of the standardized coupling 20 is based on the Common Attach System (CAS) which is designed for use aboard the ISS to attach relatively large payloads.

The payload assembly fixture 18 on the delivering space vehicle 14 enables payloads to be joined together and held in place as additional payloads 10 are added as described above. In this respect, the payload assembly fixture 18 performs a function similar to a railroad switching yard, namely, allowing assembly of a chain of payloads into one connected train. In a preferred embodiment, the payload assembly fixture 18 includes a pair of rails that are normally folded inside of the delivering space vehicle 14 during launch and transit in a configuration parallel to the vehicle's longitudinal axis. The rails are extended upwards from the delivering space vehicle 14 perpendicular to the vehicle's longitudinal axis during space train assembly and delivery operations, and a stack of payloads 10 can be located on each of the rails. The payload assembly fixture 18 orients the payloads 10 optimally with respect to the center of gravity of the delivering space vehicle 14. The payload assembly fixture 18 enables joined payloads 10 to be translated upward and away from the delivering space vehicle 14 to clear a region proximal to the vehicle 14 so that additional payloads 10 can be added within reach of the vehicle's remote manipulating arm 16.

Figure 3:
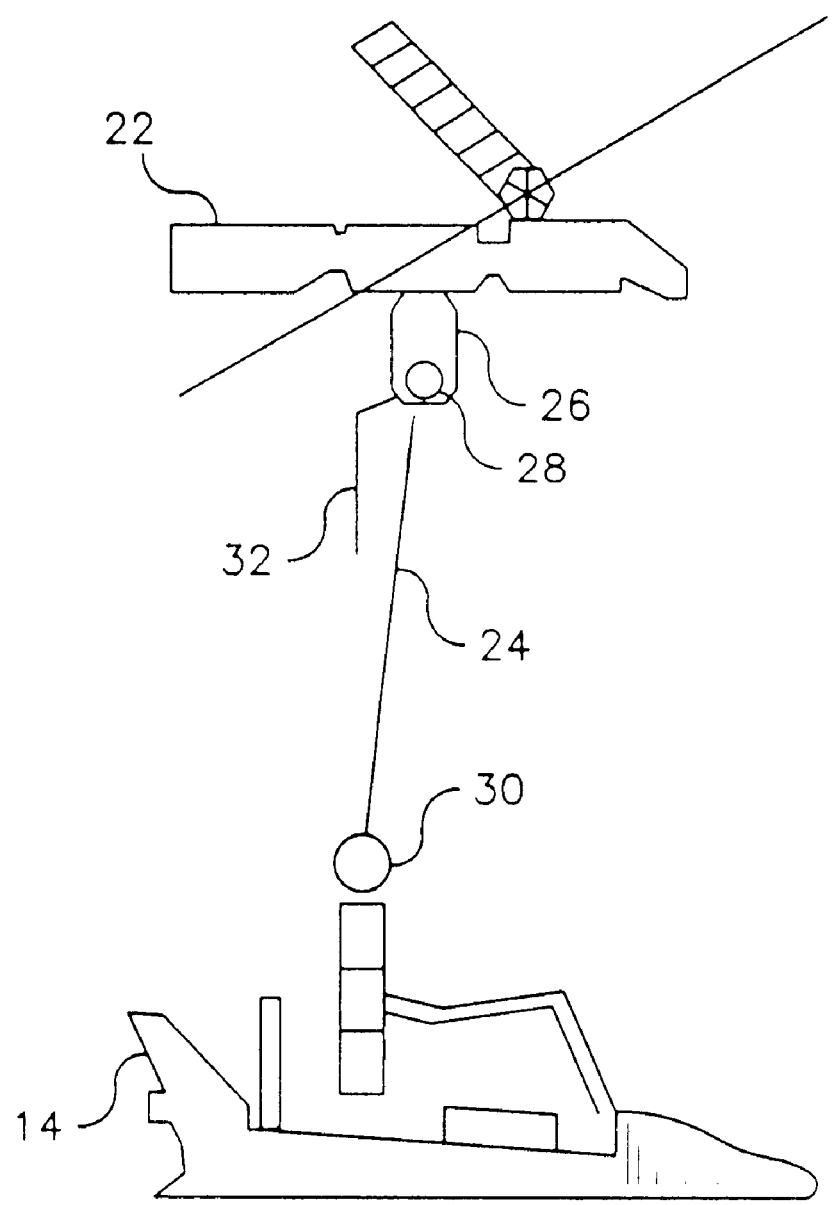
FIG. 3 illustrates the attachment of a tether retrieval system of a receiving space vehicle to a payload.

The receiving space vehicle 22 includes a tether retrieval system that allows the transfer and manipulation of the coupled payloads 10 from the delivering space vehicle 14 to the receiving space vehicle 22. As shown in FIG. 3, the tether retrieval system includes a tether 24, a tether system base 26, a tether reel assembly 28, and a tether distal end component 30. The tether system base 26 is connected to the receiving space vehicle 22, and is preferably located such that a tether force vector generated when the tether 24 operates acts close to the center of mass of the receiving space vehicle 22. The tether reel 28 deploys and retrieves the tether 22, and it supplies smooth steady state and transitional state motion in order to minimize undesirable transient movements during retrieval of the tethered object. The distal end component 30 is preferably a free-flying module that is capable of performing maneuvers such that it can intercept the orbital path of the delivering space vehicle 14, and includes a coupling that engages with the interface coupling 20 provided on the payloads 10. In a preferred embodiment, the tether distal end component 30 includes an optical alignment system that can be utilized to align the tether distal end component 30 with the payloads 10. The tether distal end component 30 is capable of achieving and maintaining a stable state of motion once deployed, and it maintains that stable state during retrieval, regardless of the mass properties of the payload 10 which is being retrieved. If desired, an assembly fixture 32 can also be provided on the receiving space vehicle 22 to enable the payloads 10 to be oriented and held in place as they are retrieved by the tether retrieval system.

Figure 4:
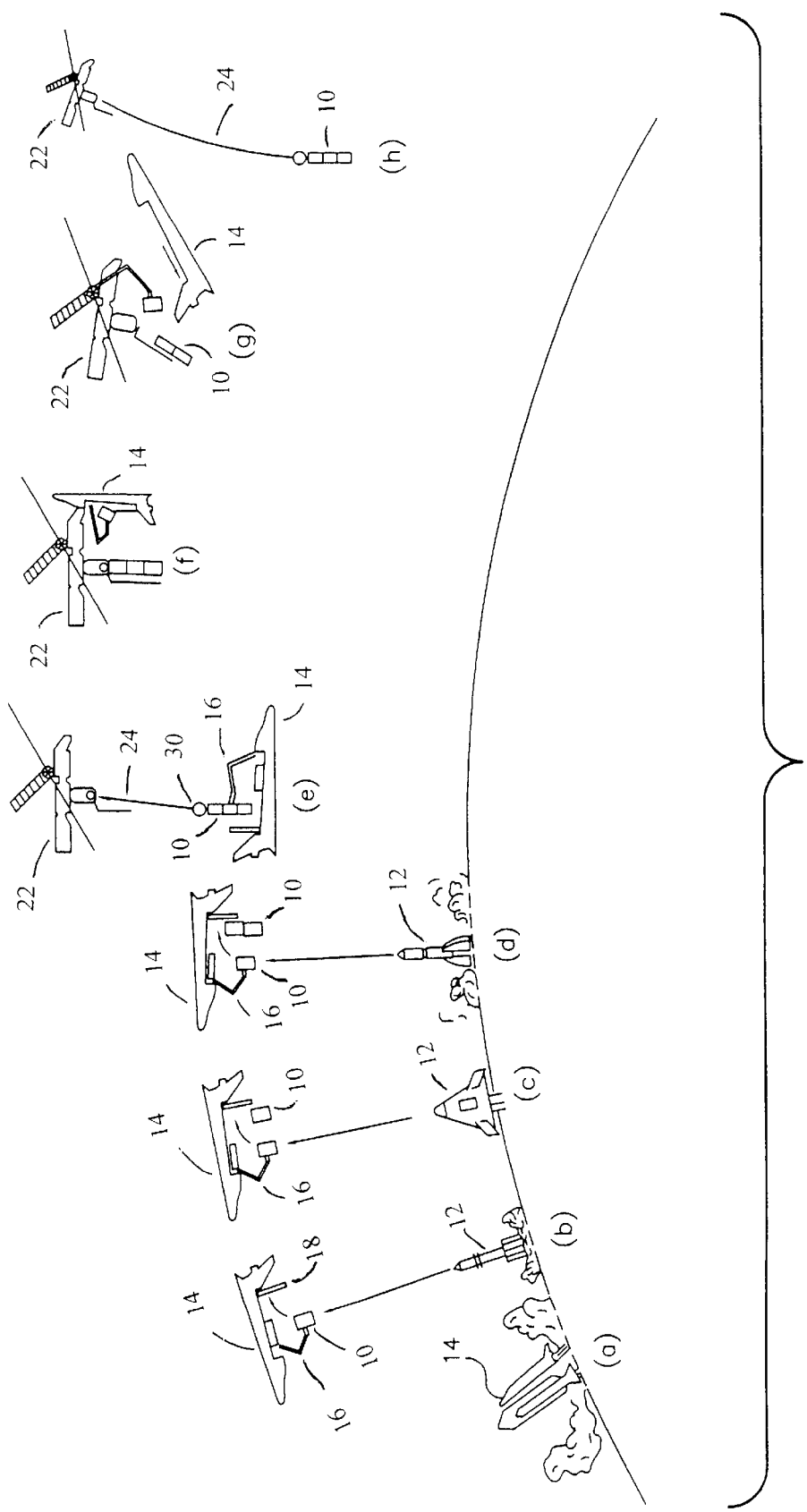
FIG. 4 illustrates the process of transferring a payload between a delivering space vehicle and a receiving space vehicle in accordance with the present invention.

A preferred embodiment of the operation of the underway replenishment system will now be described with reference to FIG. 4. The delivering space vehicle 14 is launched into Earth orbit and subsequently opens its payload doors and deploys the payload assembly fixture 18 (Step a). A plurality of payloads 10 are also launched into low Earth orbit with various types of expendable launch vehicles 12 either before or after the launch of the delivering space vehicle 14. The delivering space vehicle 14 rendezvous with the first payload 10 and used the remote manipulation arm 16 to capture the first payload 10 and install it onto a base region of the payload assembly fixture 18 (Step b). The delivering space vehicle 14 continues on its flight profile to rendezvous with a second payload 10. Meanwhile, the first payload 10 is transported up the rails of the payload assembly fixture 18 to clear the base region for retrieval of the second payload 10. The remote manipulation arm 16 is used to retrieve the second payload 10 and attache it to the base region of the payload assembly fixture 18 (Step c). The two payloads 10 are moved together only the rails of the payload assembly fixture 18 so that they couple together via their CAS interface couplings 20. Thus linked, the two payloads 10 are moved upward on the rails to again clear the base region of the payload assembly fixture for insertion of the third payload 10. The same basic procedure is repeated to attached the third payload 10 (Step d). The delivering space vehicle 14 then maneuvers in proximity with the receiving space vehicle 22, and the receiving space vehicle deploys its tether 22. The distal end of the tether 30 is maneuvered towards the delivering space vehicle 14 until it engages with the CAS interface coupling provided on the payload 10 (Step e). The stack of payloads 10 is then retrieved towards the receiving space vehicle 22 via operation of the tether reel 28 to draw in the tether 22, until the stack of payloads 10 is connected to the receiving space vehicle 22 (Step f). After transfer of the stack of payloads 10, the delivering space vehicle 14 may be hard docked to the receiving space vehicle 22 so that cargo within the cargo bay may be offloaded by the remote manipulating arm 16 is desired. The delivering space vehicle 14 then departs and the receiving space vehicle 22 can offloading the payloads 10 or further manipulate their location with its own remote locator arm (Step g). Once emptied the payloads 10 can be de-orbited using the tether 24 in order to transfer momentum transfer the receiving space vehicle 22 via the tether 24.

The invention has been described with reference to certain preferred embodiments thereof. It will be understood, however, that modification and variations are possible within the scope of the appended claims. For example, the receiving space vehicle is described as the ISS and the delivering space vehicle is described as the Space Shuttle, but it will be understood that the system can be employed with any type of space vehicles. Still further, the tether 24 can be utilized to established a tether link between two space vehicles that constitutes a conduit across which payloads are ferried, for example, by a device such as an attachment interface which travels in a recirculating loop along the tether 24. In this manner cargo, may be attached to the attachment interface and translated along the extended length of the tether 24, thereby traversing the space between the two tethered vehicles. Further, the tether 24 can be utilized to retrieve the entire delivering space vehicle back up to the receiving space vehicle. In this manner, an unmanned delivering vehicle may be retrieved and hard docked to the receiving space vehicle. Still further, a static discharge eliminator can be employed to dissipate any significant electrical potential between the host vehicle and the tethered object prior to capture. It is also noted that in the disclosed embodiment, the coupling of three payloads is described, however any number of payloads may be captured.

What is claimed is:

1. A system for underway replenishment of an orbiting receiving space vehicle comprising:
   a tether retrieval system coupled to the receiving space vehicle; and
   at least one orbiting payload adapted to be coupled to the tether retrieval system;
   wherein tether retrieval system includes a mechanism that retracts the tether to transfer the orbiting payload from a position remote from the receiving space vehicle to a position in close proximity to the receiving vehicle;
   wherein the mechanism includes a tether system base, a tether reel assembly coupled to the tether system base, a tether coupled to the tether reel assembly at a proximal end thereof, and a tether distal end component coupled to the distal end of the tether; and
   wherein the tether retrieval system further includes a payload assembly fixture coupled to a delivering space vehicle that enables a plurality of orbiting payloads to be coupled together and attached to the tether distal end component.

2. A system for underway replenishment of an orbiting receiving space vehicle comprising:
   a tether retrieval system coupled to the receiving space vehicle; and
   a delivering space vehicle including a payload assembly fixture, wherein the delivering space vehicle includes means for capturing payloads in Earth orbit and installing the payloads on the payload assembly fixture to form a payload stack;
   wherein the payload stack is adapted to be coupled to the tether retrieval system; and
   wherein tether retrieval system includes a mechanism that retracts the tether to transfer the payload stack from the delivering space vehicle to a position in close proximity to the receiving vehicle.

3. A method of transferring payloads between a delivering space vehicle and a receiving space vehicle comprising:
   launching the delivering space vehicle into Earth orbit;
   launching a plurality of payloads into Earth orbit;
   capturing and installing the payloads onto a payload assembly fixture provided in the delivering space vehicle to form a payload stack;
   maneuvering the delivering space vehicle into proximity with the receiving space vehicle, wherein the receiving space vehicle includes a tether retrieval system that includes a retractable tether; and
   using the tether retrieval system of the receiving space vehicle to transfer the payload stack from the delivering space vehicle to the receiving space vehicle by retracting the tether.

\* \* \* \* \*